United States Patent [19]

Sinnema

[11] 3,834,851

[45] Sept. 10, 1974

[54] ENDLESS BELT GUIDING MEANS FOR FEEDING MATERIAL INTO A SERIES OF MOLDS

[75] Inventor: Hendrik Sinnema, Sneek, Netherlands

[73] Assignee: W. Hubert & Co. Machinefabriek N.V., Sneek, Netherlands

[22] Filed: May 31, 1972

[21] Appl. No.: 258,359

[30] Foreign Application Priority Data
June 1, 1971   Netherlands...................... 7107479

[52] U.S. Cl.................. 425/261, 425/371, 425/397
[51] Int. Cl............................................. B29b 5/00
[58] Field of Search ........... 425/122, 126, 145, 148, 425/242, 246, 253, 256, 261, 259, 260, 371, 397

[56] References Cited
UNITED STATES PATENTS
1,270,096   6/1918   Baker................................. 425/371
2,595,865   5/1952   Lunsford............................ 425/371

FOREIGN PATENTS OR APPLICATIONS
491,550   3/1954   Italy................................... 425/371
131,705   12/1960   U.S.S.R............................. 425/434

Primary Examiner—Robert D. Baldwin
Assistant Examiner—John McQuade
Attorney, Agent, or Firm—Eric H. Waters

[57] ABSTRACT

Apparatus for the manufacturing of molded products from pre-formed clods of kneadable material in which the preformed clods are transported to a molding station, whereat molds are supplied in succession at a lower level. A stationary guide is disposed above the molds for receiving a clod and vertically guiding the same for discharge at a pre-determined velocity into a waiting mold where the clod substantially fills the mold of it own accord.

5 Claims, 1 Drawing Figure

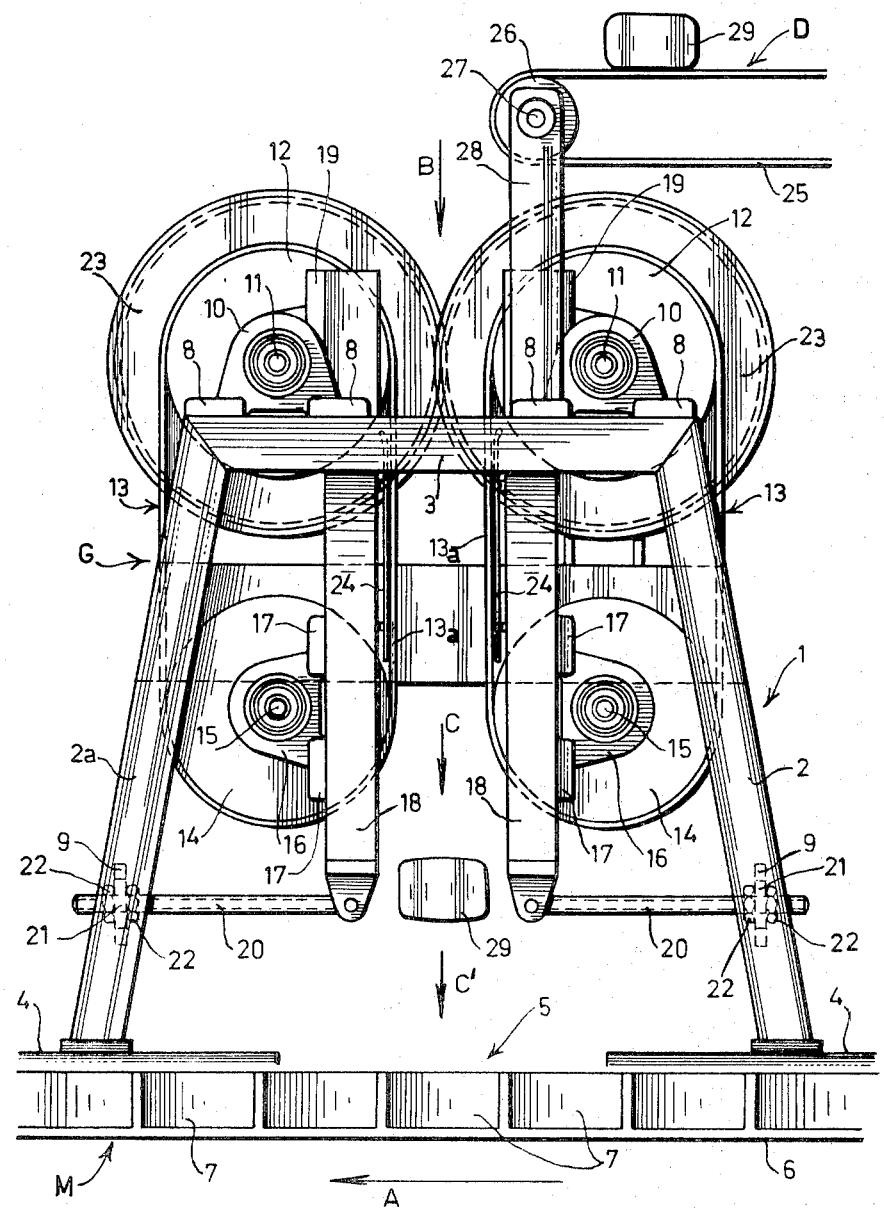

ENDLESS BELT GUIDING MEANS FOR FEEDING MATERIAL INTO A SERIES OF MOLDS

BACKGROUND

1. Field of the Invention

The invention relates to apparatus for manufacturing molded products from clods of clay or like kneadable material, each clod being more or less pre-formed and, optionally sprinkled with sand or similar material, the pre-formed clod being deposited at a particular velocity, into a waiting mold so that the clod substantially fills the mold.

2. Prior Art

It is known to manufacture handmade bricks by an exclusively manual process in which an operator throws a pre-formed and optionally sanded clod into a mold with a force based on experience. It has been proposed, when the manufacture by hand is partially or fully mechanized, to drop the clods into a mold from a particular height to be determined by experiment. However in the case of a free descent there is the risk that the pre-formed clod will not travel exactly vertically and land in the mold without contacting the walls of the mold.

SUMMARY OF THE INVENTION

The inventor has discovered that only if the clods undergo free descent and land in the mold without contact with the walls, will the sanded clod become a molded product with an attractive grain pattern which is characteristic for handmade bricks. This grain pattern is not obtained to any great degree when the clod is pressed into the mold or even if the molded product is only finish-pressed in the mold. In order to obtain the desired effect, i.e., handmade bricks by a manufacture in a mechanized process, it is absolutely necessary that the pre-formed clod of clay completely fill the interior of the mold from the inside and at most a wad thereof which protrudes from the mold is cut away.

It is an object of the invention to provide an apparatus which meets the above requirements so as to produce bricks which have the appearance of handmade bricks.

This object is attained according to the invention by an arrangement in which the clod of material is guided through a stationary device in a vertical path above a waiting mold, and before the clod reaches the mold, it is allowed to freely drop therein at a predetermined velocity without contact with the stationary guiding device.

Since the clod should land in the mold with a velocity depending on various technical factors such as its size, shape, composition and the like, and since it may be desirable to reduce the height of the guiding device, it is a feature of the invention that the kinetic energy or speed of the clod is increased when it is traveling through the guiding device.

The apparatus incorporates means for pre-forming clods of clay or like material and for transporting said clods to the station at which the molding is to be effected, and the apparatus is characterized in that between the location at which the clods are supplied and the location at which the molds are present there is provided a guiding device for travel of the clods to the molds.

In a preferred embodiment of the invention, the guiding device comprises two endless conveyor belts having opposed vertical running surfaces which are spaced from one another and travel in the same direction to grip the clods introduced therebetween and force the clods to leave the guiding device at a speed equal to that at which the endless belts are traveling.

It is contemplated by the invention to support at least one of the conveyor belts of the guiding device in adjustable relation as regards its longitudinal position so that at the inlet end between the belts, the space between the belts can be slightly increased and, as a consequence, the downward convergency of the two conveyor belts can cause the clods to be additionally preformed before being deposited into the mold.

BRIEF DESCRIPTION OF THE DRAWING

In the sole figure of the DRAWING there is diagrammatically illustrated a side elevational view of the guiding device according to the invention, the conveyor belts for supplying the clods and the molds also being illustrated diagrammatically.

DETAILED DESCRIPTION

Referring to the drawing, therein is diagrammatically shown a device D for feeding clods 29 of clay or like kneadable material to a guiding device G which receives the clods and guides the same into a molding device M where the clods are molded with a grain pattern characteristic of handmade bricks.

The guiding device G comprises a frame having two transverse supports 1 only one of which is visible in the drawing. Each support includes two legs 2 and 2a and a supporting cross beam 3. The frame rests on a working platform 4. An opening 5 is provided in the platform 4 under a central part of the guiding device G. The molding device M travels underneath the working platform and comprises a conveyor belt 6 on which molds 7 are transported in the direction of arrow A. The two supports 1 are also interconnected by transverse supporting ribs 8 secured on the cross beams 3. The legs 2 and 2a of each of both supports 1 are respectively interconnected by a vertical metal plateshaped rib 9. Stiffening cross struts (not shown) may also be provided if necessary.

Mounted on each pair of supporting ribs 8 on either side of the longitudinal center plane of the guiding device are two journal bearings 10 aligned with one another and symmetrically disposed on either side of a central plane between the two supports. Each pair of journal bearings 10 rotatably supports the ends of a respective shaft 11. At the center of each shaft 11 there is fixedly mounted a wheel 12 on which passes an endless belt 13. The endless belt 13 is passed over a wheel 14 disposed under the wheel 12. The wheel 14 is fixedly secured to a shaft 15 which is rotatably supported in two bearing supports 16 which are symmetrically disposed on either side of the central plane between the two supports 1. The supports 16 are aligned with one another and are secured to two supporting ribs 17 which are disposed in parallel relation one above the other and in turn secured to two parallel uprights 18 (only the fronts of which are visible in the drawing). The uprights 18 together with the supporting ribs 17 constitute rigid assemblies each of which is connected at its upper end to a respective supporting member 19 which is partially visible in the drawing and which is rotatable about a respective shaft 11. Each rigid assembly of members 17, 18, 19 can thus swing around the shaft 11 and thereby each wheel 14 can be moved slightly, towards or away from the longitudinal central plane of the guiding device. To enable adjustment of each wheel 14 relative to its associated wheel 12 the lower end of upright 18 is pivotably connected to one end of a threaded rod 20 whose other end passes through an elongated hole 21 provided in the corresponding plate-shaped rib 9, and on the inner and outer side of the rib 9, adjusting nuts 22 are screwed on the rod 20. Hence, by adjusting the position of rod 20 in plate 9, the lateral position of wheel 14 relative to wheel 12 can be adjusted.

A toothed drive wheel 23 is fixedly secured on each shaft 11. The two driving wheels 23 are identical and are in mesh with one another. When one of the two drive wheels 23 is driven (by means not shown) the other drive wheel is automatically rotated at the same speed but in opposite direction. Consequently, the two endless belts 13 also move in opposite directions about the wheels 12 and 14, but the lengths or reaches 13a of the belts, which face each other on either side of the central longitudinal plane of the device, have the same direction of travel. In order to prevent the belts 13 from deviating outwards with respect to the central longitudinal plane, an abutment plate 24 is secured on each pair of uprights 18.

Above the guiding device G is situated one end of an endless conveyor belt 25 of feeding device D. The belt 25 passes over a wheel 26 having an axle 27 supported at opposite ends in uprights 28 (only one of which is visible in the drawing). Each upright 28 bears on a supporting rib 8. The clods 29 are supplied on the conveyor belt 25 and when one reaches the end of the belt, it freely drops into the space between reaches 13a of belts 13 which it is guided vertically and accurately discharged at the lower end of belts 13 so as to be deposited with precision in the center of a mold 7.

The device operates as follow:

When the uprights 18 are adjusted so that the reaches 13a of the endless conveyor belts 13 are exactly parallel to one another, the driven guiding device operates, depending on the size of the supplied clod 29, either exclusively as a guide whereby the clod falls directly vertically into the waiting mold, or as a guide in which additional kinetic energy is imparted to the clod. In the latter case the clod is pre-formed and optionally covered with sand, in conventional devices (not shown) by hand or mechanically and is made of a size such that, when it falls from the conveyor belt 25 into the entry of the guiding device in the direction of arrow B, the clod is gripped on either side by the moving endless belts 13 and is forced to move at the speed of the belts and to be discharged from the guiding device in the direction of arrows C and C' and enter the mold 7 substantially at such speed. The speed of travel of the endless belts 13 is adjustable, and in this way, for a relatively small height of the guiding device a sufficient velocity is imparted to the clod 29 to eject the clod with sufficient force into the mold 7 so that a molded product is obtained which resembles a brick molded by hand.

The uprights 18 can be adjusted so that the reaches 13a of the endless belts diverge upwards to effect preforming of the clod 29 during its movement through the guiding device.

Obviously the constructive details described hereinbefore can be modified within the scope of the invention. Thus, the drive of the endless belts can be independently effected for each belt, and the adjusting means for the uprights may be modified etc. The means by which the pre-formed and optionally sanded clods are transported to the guiding device may be substantially modified and, it is even possible for a operator to drop the pre-formed clods by hand into the guiding device.

What is claimed is:

1. Apparatus for the manufacture of molded bricks from pre-formed distinct clods of kneadable material, said apparatus comprising transport means for transporting distinct pre-formed clods of materials one after another to a molding station, a succession of molds laterally supplied to the molding station at a location spaced below the transport means, and guide means disposed below the transport means and above the molds for receiving each clod in succession and guiding the same for individual discharge at a pre-determined velocity into a waiting mold where the clod is freely deposited into the mold without contacting the walls thereof and then substantially fills the mold of its own accord, said transport means being disposed above the guide means in spaced relation to directly drop the clods one by one thereto, said guide means being disposed in spaced relation above the molds and comprising two endless traveling belts having opposed lengths spaced from one another and positioned to receive each clod and transport the same and discharge the clod at speed of travel of the belts for free fall into the respective waiting mold.

2. Apparatus as claimed in claim 1 comprising drive means for driving said belts along closed circuits in opposite direction such that said opposed lengths travel in the same direction.

3. Apparatus as claimed in claim 2 wherein said drive means is speed adjustable.

4. Apparatus as claimed in claim 2 wherein said guide means further comprises means supporting said belts for permitting angular adjustment of said lengths with respect to the longitudinal direction of travel thereof.

5. Apparatus as claimed in claim 1 wherein said guide means further comprises a frame, first wheels supported from said frame and on which said belts travel, second wheels on which said belts travel, and a subassembly supporting each second wheel and in turn supported from said frame for pivotal movement to adjust the relative angular position and spacing of the opposed lengths of the belts.

* * * * *